United States Patent
Lee

(10) Patent No.: US 8,422,746 B2
(45) Date of Patent: Apr. 16, 2013

(54) FACE AUTHENTICATION SYSTEM AND AUTHENTICATION METHOD THEREOF

(75) Inventor: Kyoung Tai Lee, Yongin-si (KR)

(73) Assignee: Samsung Electro-Mechanics Co., Ltd. (KR)

( * ) Notice: Subject to any disclaimer, the term of this patent is extended or adjusted under 35 U.S.C. 154(b) by 862 days.

(21) Appl. No.: 12/489,706

(22) Filed: Jun. 23, 2009

(65) Prior Publication Data

US 2010/0272328 A1    Oct. 28, 2010

(30) Foreign Application Priority Data

Apr. 28, 2009    (KR) .................. 10-2009-0037158

(51) Int. Cl.
*G06K 9/00*    (2006.01)

(52) U.S. Cl.
USPC .......................................... 382/118

(58) Field of Classification Search .................... 382/118
See application file for complete search history.

(56) References Cited

U.S. PATENT DOCUMENTS

| | | | |
|---|---|---|---|
| 2006/0126905 A1* | 6/2006 | Loo | 382/118 |
| 2007/0206842 A1* | 9/2007 | Hamid | 382/125 |
| 2007/0253604 A1* | 11/2007 | Inoue et al. | 382/118 |
| 2008/0267459 A1* | 10/2008 | Nakada et al. | 382/118 |
| 2009/0141144 A1* | 6/2009 | Steinberg | 348/222.1 |

FOREIGN PATENT DOCUMENTS

| | | |
|---|---|---|
| JP | 2006040151 | 2/2006 |
| KR | 1020020036143 | 5/2002 |
| KR | 1020080106426 A | 12/2008 |

OTHER PUBLICATIONS

Korean Office Action for Application No. 10-2009-0037158 mailed Jan. 6, 2011.

* cited by examiner

*Primary Examiner* — John Strege
(74) *Attorney, Agent, or Firm* — Lowe Hauptman Ham & Berner, LLP

(57) ABSTRACT

The present invention relates to a face authentication system and an authentication method thereof. The system includes a photographing unit for detecting a face image of an authentication target person by using an auto focus lens equipped therewith; a distance extraction unit for extracting a distance from the photographing unit to a face of the authentication target person; a feature extraction unit for extracting feature points and distances therebetween of the face image for the authentication target person, which are detected by the photographing unit; an analysis unit for performing an analysis by comparing a distance to the face of the authentication target person extracted from the distance extraction unit with pre-registered distance information to the face of the authentication target person, and comparing feature points and distances therebetween of the face image for the authentication target person, which are extracted from the feature extraction unit, with pre-registered information of the face image of the authentication target person; and an authentication unit for authenticating the authentication target person according to an analysis result obtained by comparison of the analysis unit.

20 Claims, 3 Drawing Sheets

FACE AUTHENTICATION SYSTEM AND AUTHENTICATION METHOD THEREOF

CROSS-REFERENCE TO RELATED APPLICATIONS

This application claims the benefit of Korean Patent Application No. 10-2009-0037158 filed with the Korea Intellectual Property Office on Apr. 28, 2009, the disclosure of which is incorporated herein by reference.

BACKGROUND OF THE INVENTION

1. Field of the Invention

The present invention relates to a face authentication system and an authentication method thereof; and, more particularly, to a face authentication system including a photographing unit equipped with an auto focus lens, a distance extraction unit, and a feature extraction unit, and an authentication method thereof.

2. Description of the Related Art

In general, a face authentication system refers to a system used to perform personal authentication through the face of an authentication target person. Such a system is used for personal identification when the authentication target person enters a specific building or a specific place within the building.

A recently used face authentication system employs a feature point extraction scheme for photographing the face of an authentication target person, registering feature points of the face, which are capable of identifying the authentication target person, as registration data, extracting feature point data of the face through re-photographing of the authentication target person when authenticated, and deciding whether or not the authentication target person is right through comparison of the registration data with the feature point data.

However, the face authentication system employing such a feature point extraction scheme is sensitive to lighting and expression variation, and has many problems such as some recognition reduction deterioration and mis-recognition, which result from disguise, beard change, wearing of glasses or a hat, and facial shape change due to a plastic operation.

SUMMARY OF THE INVENTION

The present invention has been invented in order to overcome the above-described problems and it is, therefore, an object of the present invention to provide a face authentication system and an authentication method thereof in which a face of an authentication target person is photographed by a photographing unit equipped with an auto focus lens, a distance to the face of the authentication target person and feature points and distances therebetween of an image face are extracted, and then pre-registered distance information of the authentication target person is compared with face image information.

In accordance with one aspect of the present invention to achieve the object, there is provided a face authentication system for including: a photographing unit for detecting a face image of an authentication target person by using an auto focus lens equipped therewith; a distance extraction unit for extracting a distance from the photographing unit to a face of the authentication target person; a feature extraction unit for extracting feature points and distances therebetween of the face image for the authentication target person, which are detected by the photographing unit; an analysis unit for performing an analysis by comparing a distance to the face of the authentication target person extracted from the distance extraction unit with pre-registered distance information to the face of the authentication target person, and comparing feature points and distances therebetween of the face image for the authentication target person, which are extracted from the feature extraction unit, with pre-registered information of the face image of the authentication target person; and an authentication unit for authenticating the authentication target person according to an analysis result obtained by comparison of the analysis unit.

In this case, the photographing unit may further include a zoom lens.

In this case, the photographing unit may include: an image decision unit for deciding a state of the face image of the authentication target person; and an adjustment unit for adjusting settings of the photographing unit according to a decision result of the image decision unit.

In this case, the distance extraction unit may further include a lens location detection unit for detecting a current location value of the zoom lens and an auto focus lens.

The feature points may correspond to data obtained by analyzing locations of muscles, which are used owing to expression of the authentication target person.

In this case, the feature extraction unit can extract feature points of each of a general face image and a specific face image for the authentication target person. Herein, the feature points of each of a general face image and a specific face image for the authentication target person can be extracted according to high or low of a predetermined security level.

The feature points of the general face image may correspond to feature points for lack of expressions of the authentication target person, and the feature points of the specific face image corresponds to feature points of expressions made when the authentication target person laughs or winks.

The face image information may include feature point information and distance information therebetween of the face image for the authentication target person.

In this case, the analysis unit includes: a registration unit for having pre-extracted distance information to the face of the authentication target person registered therein; and a comparison unit for performing comparison between the distance information to the face of the authentication target person, having been previously stored in the registration unit, and the distance to the face of the authentication target person, extracted from the distance extraction unit, and between the face image information of the authentication target person, having been stored in the registration unit, and feature points and distances therebetween of the face image for the authentication target person, extracted by the feature extraction unit.

In accordance with another aspect of the present invention to achieve the object, there is provided a face authentication method including the steps of: photographing a face image of an authentication target person by a camera equipped with an auto focus lens; extracting feature points and distances therebetween of the face image for the authentication target person; performing an analysis through comparison between the extracted distance to the face of the authentication target person and a pre-registered distance information to the face of the authentication target person, and between feature points and distances therebetween of the face image for the authentication target person and a pre-registered face image information for the authentication target person; and authenticating the authentication target person through an analysis result obtained by the comparison.

Also, the method further includes a step of setting a security level of the fact authentication system, before the step of photographing the face image of the authentication target person.

Also, the method further includes a step of pre-registering the face image information of the authentication target person and distance information to the face of the authentication target person, before the step of photographing the face image of the authentication target person.

The step of pre-registering the face image information of the authentication target person and distance information to the face of the authentication target person may include the steps of: photographing the face image of the authentication target person by a camera equipped with a zoom lens and an auto focus lens; extracting distance information to the face of the authentication target person; extracting face image information representing feature points and distances therebetween of the face image of the authentication target person; storing the extracted distance information to the face and the extracted face image information of the authentication target person; and completing registration of the authentication target person.

In the step of extracting the distance to the face of the authentication target person, the distance to the face of the authentication target person can be extracted by detecting a current location value of the zoom lens and the auto focus lens controlled in the step of photographing the face image of the authentication target person.

Also, the method may further include a step of recognizing a predetermined security level, after the step of extracting the distance to the face of the authentication target person.

In the step of extracting the feature points of the face image of the authentication target person, feature points can be extracted with respect to a general face image of the authentication target person when a security level is low, and feature points are extracted with respect to a specific face image of the authentication target person when a security level is high.

In the step of authenticating the authentication target person, the face of the authentication target person can be distinguished when an analysis result, obtained through comparison in the step of performing the analysis through the comparison, shows that degree of agreement is high, and the face of the authentication target person can be distinguished when the analysis result shows that the degree of agreement is low.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Hereinafter, embodiments of the present invention will be described in detail with reference to the accompanying drawings illustrating technical construction as well as action effect of the face authentication system and an authentication method thereof. The following embodiments are provided as examples to allow those skilled in the art to sufficiently appreciate the spirit of the present invention.

A system and a method for face authentication will be described in more detail with reference to FIGS. 1 to 3.

Face Authentication System

Figure 1:
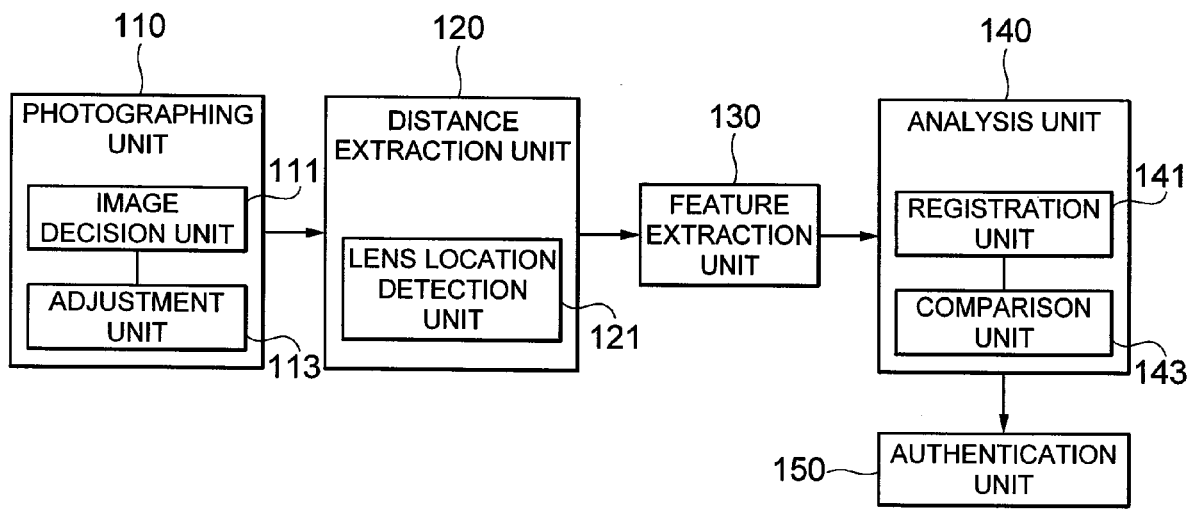
FIG. 1 is a block diagram illustrating a construction of a face authentication system in accordance with an embodiment of the present invention.

FIG. 1 is a block diagram illustrating a face authentication system in accordance with an embodiment of the present invention.

Referring to FIG. 1, a face authentication system 100 in accordance with the present invention may include a photographing unit (camera) 110, a distance extraction unit 120, a feature extraction unit 130, an analysis unit 140, and an authentication unit 150. The distance extraction unit 120, the feature extraction unit 130, the analysis unit 140, and the authentication unit 150 are implemented by software run on a computer system (not shown) connected to the photographing unit 110.

Herein, the face authentication system 100 refers to a system used to perform personal authentication through an authentication target person, and may be used for personal identification when the authentication target person enters a specific building or a specific place within the building.

In addition, the face authentication system 100 may be variously used for uses of personal identification, requiring at the time of a request of financial transactions in a window at branches of financial agencies such as post offices, banks, and so on, or at the time of financial transactions in transaction devices such as automatic teller machines.

The photographing unit 110 detects the person, that is, the face image of an authentication target person, who performs her/his identification. Further, the photographing unit 110 may detect a face image of the authentication target person for each distance many times. In this case, the photographing unit 110 is a photographing means, and may include a camera equipped with a zoom lens, an auto focus lens, and a charge coupled device.

The photographing unit 110 may further include an image decision unit 111 and an adjustment unit 113.

The image decision unit 111 decides whether or not the state of the face image for the authentication target person is suitable to perform personal verification.

The adjustment unit 113 adjusts settings of the photographing unit 110 according to a decision result of the image decision unit 111. In this case, the photographing unit 110 can adjust settings of camera sensitivity, an aperture, shutter speed, a color tone, and white balance, but a description will be given of an example where the zoom lens and the auto focus lens thereof are controlled for adjustment of the size and the definition of the authentication target person such that it is possible to decide the state of the face image of the authentication target person.

When the adjustment unit 113 receives input of decision result, representing that the face image of the authentication target person has a small size, from the image decision unit 111, the adjustment unit 113 controls magnification of the zoom lens so that the face image may has a size suitable for a photographing condition.

When the adjustment unit 113 also receives input of decision result, representing that the face image of the authentication target person has blurred definition, from the image decision unit 111, the auto focus lens is moved until a focus evaluation value becomes maximum so that the face image of the authentication target person has definition suitable for a photographing condition.

The distance extraction unit 120 extracts distance from the photographing unit 110 to the face of the authentication target person.

The distance extraction unit 120 includes a lens location detection unit 121. The lens location detection unit 121 is connected to an output side of the photographing unit 110 so that the lens location detection unit 121 can detect a current location value of the zoom lens and the auto focus lens. In this case, when the photographing unit 110 detects a face image of the authentication target person according to each distance, the lens location detection unit 121 can detect all current location values of the zoom lens and the auto focus lens according to each distance.

Once the current location values of the zoom lens and the auto focus lens are obtained in this manner, it is possible to catch the face size of the authentication target person. The face size of the authentication target person is inversely proportional to the distance from the photographing unit 110 to the face of the authentication target person, whereas the face size of the authentication target person is proportional to the magnification of the zoom lens. Therefore, the lens location detection unit 121 of the distance extraction unit 120 detects the current location values of the zoom lens and the auto focus lens of the photographing unit 110 so as to calculate the distance to the face of the authentication target person.

The feature extraction unit 130 extracts feature points and distance between feature points of the face image of the authentication target person detected by the photographing unit 110. Herein, the feature point is data obtained by analyzing locations of muscles, which are used owing to expression of the authentication target person. That is, the feature point indicates features of a face (e.g. eyes, a nose, and lips), which is used to identify the authentication target person.

The feature extraction unit 130 includes feature points of a general face image, which are detected when the authentication target person has no expression variation, and feature points of a specific face image, which are detected when the authentication target person laughs or winks. In this case, the feature points of the general face image and the feature points of the specific face image may be detected dependent on a predetermined security level. When the security level is low, the feature points of the general face image are detected. When the security level is high, the feature points of the specific face image are detected.

The analysis unit 140 performs an analysis by comparing the distance to the face of the authentication target person, which is extracted by the distance extraction unit 120, the feature points and the distance between feature points of the face image of the authentication target person, which is extracted by the feature extraction unit 130, with the face image information of the authentication target person, which has been previously registered.

The analysis unit 140 includes a registration unit 141, and a comparison unit 143.

Both the distance information to the face and the face image information for the authentication target person, having been previously extracted, are registered in the registration unit 141. Herein, the face image information includes feature point information and distance between feature points of the face image for the authentication target person.

The comparison unit 143 compares the distance information to the face of the authentication target person, which has been stored in the registration unit 141, with the distance to the face of the authentication target person extracted by the distance extraction unit 120, and compares the face image information of the authentication target person, which has been stored in the registration unit 141, with feature points and distances therebetween of the face image for the authentication target person, which are extracted by the feature extraction unit 130, for calculation of an degree of agreement.

For example, it is assumed that the comparison unit 143 uses a calculation scheme in which the degree of agreement is distributed over a range from 0 (absence of matched features) to 100 (perfect match of all features). If the authentication target person is identical to the authentication person registered in the registration unit 141, there are a number of matched face features. In case when the comparison result of the comparison unit 143 shows that the degree of agreement is equal to or higher than 80, the authentication target person is identified as the person himself/herself. When the degree of agreement is lower than 80, it is possible to judge that authentication target person may be another person. In this case, an identification threshold may have a value of 80. The identification threshold value is a parameter representing a standard used to judge whether or not the authentication target person having been registered in the registration unit 141 is identical to the authentication target person.

The authentication unit 150 authenticates the authentication target person according to an analysis result obtained by comparison of the analysis unit 140.

When the degree of agreement measured by the comparison unit 143 of the analysis unit 140 is equal to or higher than the identification threshold value, the authentication unit 150 can distinguish that the face of the authentication target person is true. When the degree of agreement is lower than the identification threshold value, the authentication unit 150 can distinguish that the face of the authentication target person is false.

The face authentication system 100 having the construction as described above distinguishes whether or not the face of the authentication target person is true, by extracting each of the distance to the face, feature points and distances therebetween of the face image for the authentication target person, and then comparing the extracted information with the pre-registered information.

Therefore, even if a picture of the authentication target person or a doll similar to the authentication target person for hoodwinking is located in front of the photographing unit 110, for detection of the face image thereof, it is possible to easily distinguish the hoodwinking since the distance information to the face of the authentication target person having been previously registered and the feature point information of the face image of the authentication target person are not identical to those of the picture or the doll for hoodwinking.

Face Authentication Method

Hereafter, embodiments of a face authentication method in accordance with the present invention will be described in detail with reference to the accompanying drawings. In describing the embodiments with reference to the accompanying drawings, the same or corresponding component is represented by the same reference numeral and overlapping description thereof will be omitted.

Hereinafter, the face authentication method in accordance with the embodiment of the present invention will be separately described for each of a registration processing operation and an authentication processing operation for an authentication target person.

Figure 2:
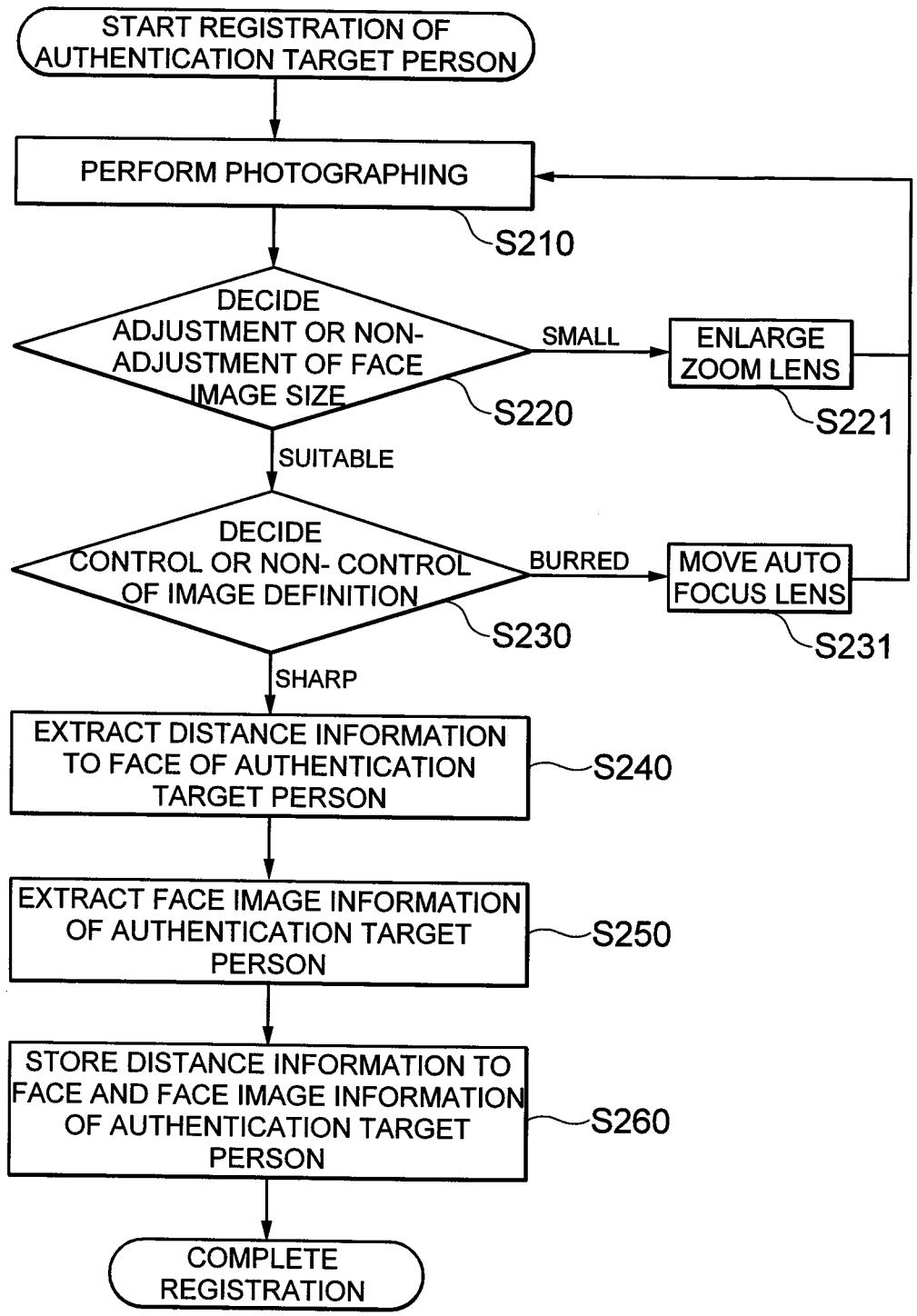
FIG. 2 is a flowchart illustrating a registration processing operation of an authentication target person by using the face authentication system in accordance with the embodiment of the present invention.

FIG. 2 is a flowchart illustrating a registration processing operation of an authentication target person by the face authentication system in accordance with the embodiment of the present invention.

Referring to FIG. 2, an authentication target person is located in front of the face authentication system 100, and then the face of the authentication target person is photographed by the face authentication system 100 in step S210. In this case, the photographing unit 110 detects a face image of the authentication target person. The photographing unit 110 corresponds to a camera, which is equipped with a zoom lens, an auto focus lens, and charge coupled device. The image decision unit 111 decides the state of the face image for the authentication target person. Then, the adjustment unit 113 adjusts the size of the face image of the authentication target person through the zoom lens, according to a result of the image decision unit 111 in steps S220 and S221. Then, the adjustment unit 113 controls the definition of the face image for the authentication target person through the auto focus lens in steps S230 and S231.

Thereafter, distance information to the face of the authentication target person is extracted in step S240. In this case, the lens location detection unit 121 of the distance extraction unit 120 detects a current location value of the zoom lens and the auto focus lens of the photographing unit 110 so as to calculate distance to the face of the authentication target person.

Next, the face authentication system 100 extracts face image information including the feature point information and the distance information between feature points of the face image of the authentication target person in step S250. In this case, the feature extraction unit 130 extracts feature point information and distance information between feature points from the face image of the authentication target person, which is detected by the photographing unit 110. The feature point information of the face image for the authentication target person includes feature point information for a general face image and a specific face image of the authentication target person.

Then, the extracted distance information to the face and the extracted face image information for the authentication target person are stored. This information is registered in the registration unit 141 of the analysis unit 140.

The above description has been given of a registration processing operation of an authentication target person by the face authentication system 100. In addition, it is possible to register a number of authentication target persons in the face authentication system, through the above-described registration processing operation of the authentication target person.

Figure 3:
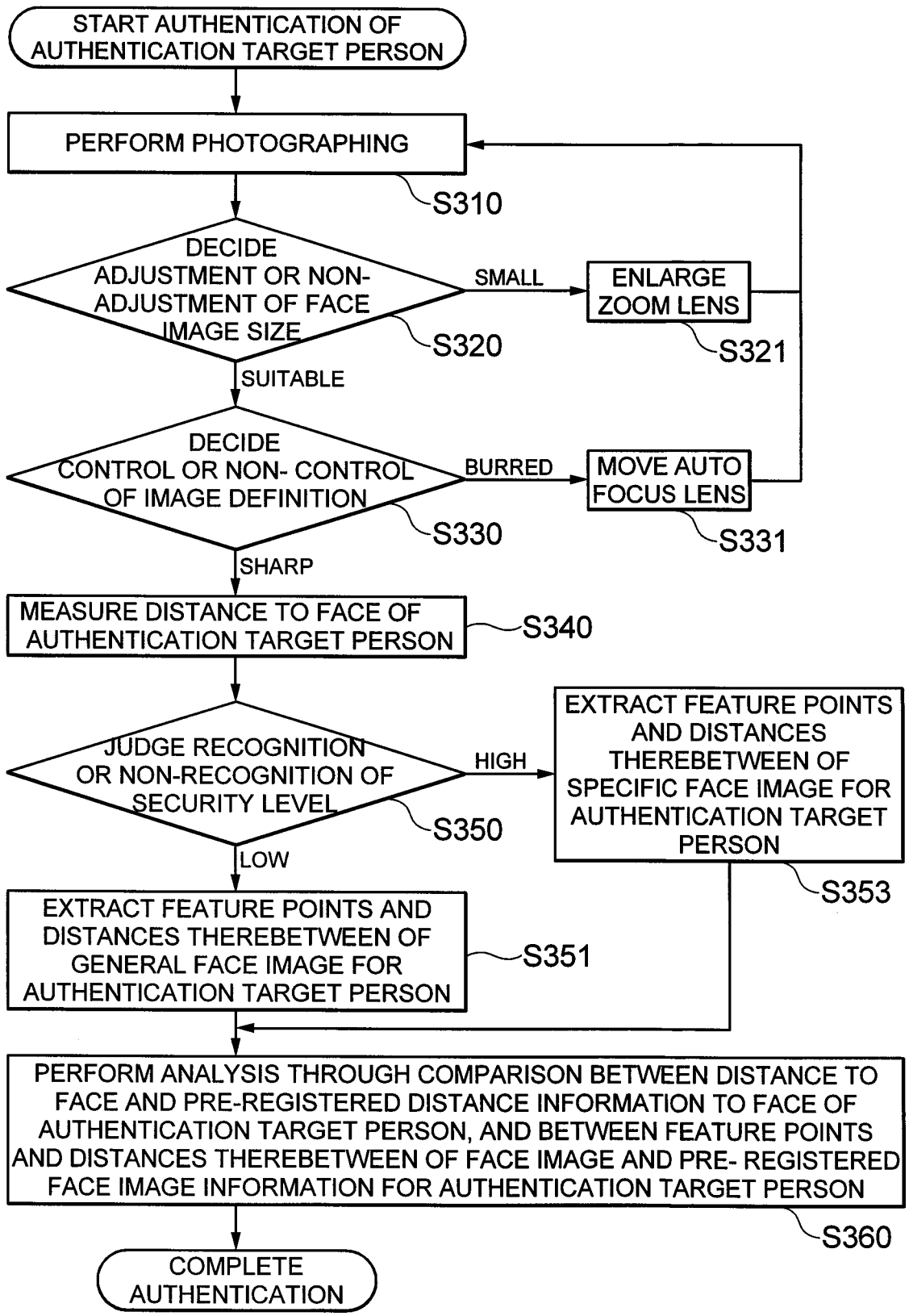
FIG. 3 is a flowchart illustrating an authentication processing operation of an authentication target person by using the face authentication system in accordance with the embodiment of the present invention.

FIG. 3 is a flowchart illustrating an authentication processing operation of an authentication target person by using the face authentication system in accordance with the embodiment of the present invention.

Referring to FIG. 3, the distance information to the face and the face image information for the authentication target person have been previously registered in the registration unit 141 of the analysis unit 140 within the face authentication system 100, as mentioned in the process of registering the authentication target person.

Also, a security level may be previously set in the face authentication system 100. When the face authentication system 100 is used in establishments requiring high-level security (e.g. a bank), the security level is set to have a high value. When the face authentication system 100 is used in establishments requiring low-level security, the security level is set to have a low value.

First, the face authentication system 100 photographs the face of an authentication target person located in front thereof in step S310. In this case, the photographing unit 110 equipped with the zoom lens, the auto focus lens, and charge coupled device detects a face image of the authentication target person.

Then, it is judged whether or not the detected face image of the authentication target person has an image state suitable for personal identification in steps S320 and S330. In this case, the image decision unit 111 decides an image state of the size and the definition of the face mage for the authentication target person.

Next, when the face image of the authentication target person has a small size, the magnification of the zoom lens is controlled. When the face image of the authentication target person has a blurred definition, the auto focus lens is moved such that the face image of the authentication target person is adjusted to conform to a photographing condition on registration processing operation of the authentication target person in steps S321 and S331. In this case, the adjustment unit 113 adjusts settings of the photographing unit 110 according to the judgment result of the image decision unit 111.

Thereafter, distance to the face of the authentication target person is measured in step S340.

In this case, the lens location detection unit 121 of the distance extraction unit 120 detects a current location value of the zoom lens and the auto focus lens of the photographing unit 110, thereby calculating the distance to the face of the authentication target person.

Then, a predetermined security level is recognized in step S350. The face authentication system extracts each of feature points and distances therebetween of the face image for the authentication target person according to the recognized security level.

When the predetermined security level is low, feature points and distances therebetween of the general face image are extracted in step S351. When the predetermined security level is high, feature points and distances therebetween of the specific face image are extracted in step S353. In this case, the feature extraction unit 130 extracts the feature points and the distances therebetween of the face image from the face image of the authentication target person detected by the photographing unit 110.

Then, comparison between the extracted distance to the face and the pre-registered distance to the face of the authentication target person, and between feature points and distances therebetween of the face image of the authentication target person and the pre-registered face image information of the authentication target person in step S360.

In detail, the comparison unit 143 of the analysis unit 140 compares the distance information to the face of the authentication target person having been stored in the registration unit 141 with the distance to the face of the authentication target person extracted from the distance extraction unit 120, and compares information of the face image for the authentication target person having been stored in the registration unit 141 with feature points and distances therebetween of the face image for the authentication target person extracted from the feature extraction unit, thereby calculating degree of agreement.

Finally, the authentication target person is authenticated by an analysis result obtained through the comparison. When the analysis result shows that the degree of agreement is low, it is distinguished that the face of the authentication target person is true. When the analysis result shows that the degree of agreement is high, it is distinguished that the face of the authentication target person is false. In this case, the authentication unit 150 distinguishes the authentication target person according to a comparison result of the analysis unit 140.

As described above, a system and a method for face authentication in accordance with the present invention are advantageous in that it is possible to more accurately distinguish true or false of the face of an authentication target person, by photographing the authentication target person through a photographing unit equipped with an auto focus lens, extracting distance to the face, feature points of a face image, and distances between feature points for authentication target person, and then comparing the face image information with a pre-registered distance information of the authentication target person.

Therefore, the present invention can improve security effect, by minimizing mis-recognition or hoodwinking.

As described above, although the preferable embodiments of the present invention have been shown and described, it will be appreciated by those skilled in the art that substitutions, modifications and changes may be made in this embodiment without departing from the principles and spirit of the general inventive concept, the scope of which is defined in the appended claims and their equivalents.

What is claimed is:

1. A face authentication system, comprising:
a photographing unit configured to detect a face image of an authentication target person by using an auto focus lens equipped therewith; and
a computer system coupled to the photographing unit and defining
a distance extraction unit configured to extract a distance from the photographing unit to a face of the authentication target person based on a position of the auto focus lens when detecting the face image of the authentication target person;
a feature extraction unit configured to extract feature points of the face image of the authentication target person detected by the photographing unit and distances between the extracted feature points;
an analysis unit configured to perform an analysis by
comparing the distance to the face of the authentication target person extracted by the distance extraction unit with pre-registered distance information of the face of the authentication target person, and
comparing the feature points and the distances between the feature points extracted by the feature extraction unit with pre-registered face image information of the authentication target person; and
an authentication unit configured to authenticate the authentication target person based on a result of the analysis from the analysis unit, wherein the face image information includes
feature point information on feature points of the face of the authentication target person, and
distance information on distances between the feature points of the face of the authentication target person.

2. The system of claim 1, wherein the photographing unit further comprises a zoom lens.

3. The system of claim 1, wherein the photographing unit further comprises:
an image decision unit configured to decide a state of the face image of the authentication target person; and
an adjustment unit configured to adjust a setting of the photographing unit according to a result of the decision from the image decision unit.

4. The system of claim 2, wherein the distance extraction unit comprises a lens position detection unit configured to detect current position values of the zoom lens and auto focus lens, to extract the distance from the photographing unit to the face of the authentication target person from the current position values of the zoom lens and the auto focus lens.

5. The system of claim 1, wherein the feature points correspond to data obtained by analyzing locations of muscles associated with a facial expression of the authentication target person.

6. The system of claim 1, wherein
the face image includes a general face image and a specific face image, and
the feature extraction unit is configured to extract the feature points of the general face image and the specific face image of the authentication target person.

7. The system of claim 1, wherein
the face image includes a general face image and a specific face image, and
the feature extraction unit is configured to extract the feature points of the general face image and the feature points of the specific face image of the authentication target person according to a low security level and a high security level, respectively.

8. The system of claim 6, wherein
the general face image is a face image with no facial expression, and
the specific face image is a face image with a specific facial expression.

9. The system of claim 7, wherein
the general face image is a face image with no facial expression, and
the specific face image is a face image with a specific facial expression.

10. The system of claim 1, wherein the analysis unit comprises:
a registration unit configured to register the distance information of the face of the authentication target person and the face image information of the authentication target person in advance; and
a comparison unit configured to
compare the distance to the face of the authentication target person extracted by the distance extraction unit with the pre-registered distance information of the face of the authentication target person registered in advance by the registration unit, and
compare the feature points and the distances between the feature points extracted by the feature extraction unit with the pre-registered face image information of the authentication target person registered in advance by the registration unit.

11. A face authentication method for a face authentication system, the method comprising:
photographing a face image of an authentication target person by a photographing unit equipped with an auto focus lens;
extracting a distance from the photographing unit to a face of the authentication target person based on a position of the auto focus lens when photographing the face image of the authentication target person;
extracting feature points of the face image of the authentication target person detected by the photographing unit and distances between the extracted feature points;
performing an analysis through comparison between by
comparing the extracted distance to the face of the authentication target person with pre-registered distance information of the face of the authentication target person, and
comparing the extracted feature points and the distances between the feature points with pre-registered face image information of the authentication target person; and
authenticating the authentication target person based on a result of the analysis, wherein
the face image information includes
feature point information on feature points of the face of the authentication target person, and distance information on distances between the feature points of the face of the authentication target person.

12. The method of claim 11, further comprising setting a security level of the face authentication system, before the photographing.

13. The method of claim 11, further comprising pre-registering the face image information of the authentication target person and distance information of the face of the authentication target person, before the photographing.

14. The method of claim 13, wherein the pre-registering comprises:
photographing the face of the authentication target person by a photographing unit equipped with a zoom lens and an auto focus lens;
extracting distance information of the face of the authentication target person;
extracting face image information representing the feature points of the face of the authentication target person and the distances between the feature points; and
registering the extracted distance information and the extracted face image information.

15. The method of claim 11, wherein, the extracting the distance from the photographing unit to the face of the authentication target person includes detecting a current position value of the auto focus lens.

16. The method of claim 13, further comprising recognizing a predetermined security level, after the extracting the distance from the photographing unit to the face of the authentication target person.

17. The method of claim 16, wherein
the face image includes a general face image and a specific face image, and
the extracting the feature points of the face image of the authentication target person includes
extracting the feature points of the general face image of the authentication target person when the security level is low, and
extracting the feature points of the specific face image of the authentication target person when the security level is high.

18. The method of claim 11, wherein the authenticating includes authenticating the authentication target person when the result of the analysis shows that a matching degree is equal to or larger than a threshold value.

19. The system of claim 1, wherein the distance extraction unit comprises a lens position detection unit configured to detect a current position value of the auto focus lens to extract the distance from the photographing unit to the face of the authentication target person from the current position value of the auto focus lens.

20. A face authentication method, comprising:
photographing a face image of an authentication target person by a camera equipped with an auto focus lens;
extracting a distance from the camera to a face of the authentication target person when photographing the face image of the authentication target person;
extracting feature points of the face image of the authentication target person and distances between the extracted feature points;
performing an analysis by
comparing the extracted distance with pre-registered distance information of the face of the authentication target person, and
comparing the extracted feature points and the extracted distances with pre-registered face image information of the authentication target person; and
authenticating the authentication target person based on a result of the analysis;
wherein
the method further comprises:
pre-registering the face image information of the authentication target person and distance information of the face of the authentication target person, before the photographing; and
recognizing a predetermined security level, after the extracting the distance from the camera to the face of the authentication target person; and
the extracting the feature points of the face image of the authentication target person includes
extracting the feature points of a general face image of the authentication target person when the security level is low, and
extracting the feature points of a specific face image of the authentication target person when the security level is high.

* * * * *